Oct. 17, 1972  R. WISOTZKY ET AL  3,698,973
METHOD OF PREPARING A SOLID RESIN BACK CARPET TILE
Filed Aug. 12, 1970
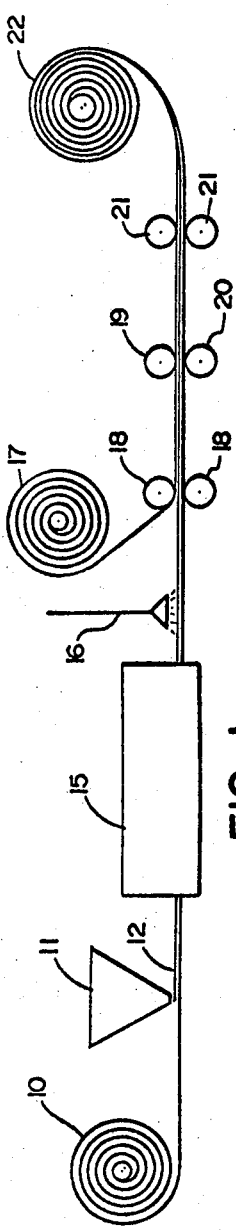
FIG. 1
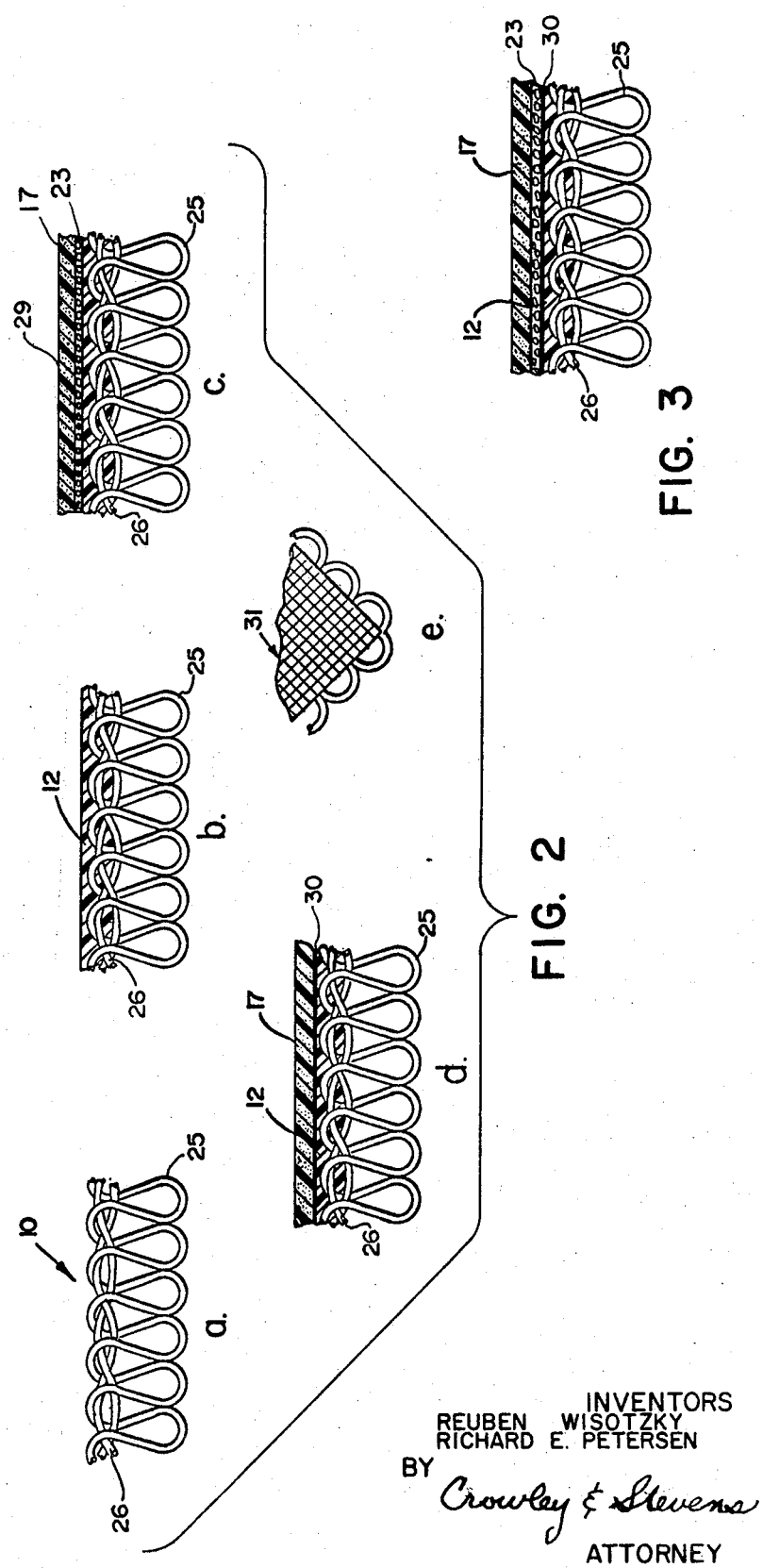
FIG. 2
FIG. 3
INVENTORS
REUBEN WISOTZKY
RICHARD E. PETERSEN
BY
Crowley & Stevens
ATTORNEY

United States Patent Office 3,698,973
Patented Oct. 17, 1972

3,698,973
METHOD OF PREPARING A SOLID RESIN BACK CARPET TILE
Reuben Wisotzky, Lexington, and Richard E. Petersen, Concord, Mass., assignors to Pandel-Bradford, Inc., Lowell, Mass.
Continuation-in-part of application Ser. No. 687,608, Dec. 4, 1967, now Patent No. 3,560,284, dated Feb. 2, 1971. This application Aug. 12, 1970, Ser. No. 63,227
Int. Cl. C09j 5/08; D05c 15/03
U.S. Cl. 156—78
14 Claims

ABSTRACT OF THE DISCLOSURE

A tufted carpet tile having a thermoplastic resin backing is prepared by applying a heat-sensitive plastisol composition to the back of a material composed of tufted yarns in a thermoplastic base fabric, fusing the plastisol composition to bind the base fabric and tufted yarns together, and laminating the thermoplastic sheet to the plastisol layer using the plastisol layer as the source of sensible heat to melt a thin thermoplastic foam layer on the thermoplastic backing to bond the backing to the plastisol layer.

REFERENCE TO COPENDING APPLICATION

The present application is a continuation-in-part application of U.S. application Ser. No. 687,608, filed Dec. 4, 1967, now U.S. Pat. 3,560,284, issued Feb. 2, 1971.

BACKGROUND OF THE INVENTION

This invention relates to improved rugs and carpets and, more particularly, to tufted carpet tile having solid backings integrally associated therewith and a process of preparing such rugs and carpets.

Tufted rugs, carpets and the like the manufactured typically by threading pile yarns, e.g., by needling, through a backing or base fabric to form pile loops. The base fabrics are woven, nonwoven or cominations of woven and nonwoven, fabrics. In the past the backings have been composed of cotton duck or jute, but now the employment of synthetic backing material composed of thermoplastic yarns such as polyolefins, preferably polypropylene, polyamides, polyesters and polyacrylics are coming into prominence.

Generally, the backing and pile loops are locked together by the application of a binder, for example, natural and/or synthetic polymeric latices. A foam backing to provide cushioning and nonskid effects is often applied in the form of a foamable latex composition which either is applied unfoamed and then foamed in place by means of blowing agents or by first foaming the latex composition, as by aeration, and then applying it to the backing and then gelling and curing the foam.

A solid sheet may be employed as a backing sheet for preparing carpet and floor-covering products. Such backing sheets are often composed of an inexpensive, heavily loaded, low fushion point, thermoplastic resin composition. The backing sheet is used to provide weight to the carpet so that the carpet will lay flat on the floor on which it is to be installed. Typically, the backing is sufficiently flexible under pressure or heat or both to permit it to conform to the contours of the floor surface on which it is to be installed. The backing sheet employed may vary in thickness and composition as desired, but may range, for example, from 50 to 400 mils in thickness and be composed of a vinyl chloride resin which contains over 100 parts of an inert particulate material per 100 parts of resin (phr.) as filler material. The back surface of the backing sheet is often secured to the floor surface by employing a liquid adhesive or tie-in composition, particularly where installed on concrete flooring. The back surface of the backing sheet may have a roughened or treated surface to enhance its bond to the floor or where not so secured, be embossed so that the back surface is characterized by a skid-resistant pattern or design thereon. Such solid backing sheets are often employed in the preparation of the less expensive grade of floor coverings, unless they are used in conjunction with thermoplastic foam-backing sheets. After preparation of the carpet products, the product may be cut into segments, such as carpet tile sections, for installation. Typically, the products may be employed both for indoor and outdoor use as desired; however, outdoor use usually requires that the tufted yarns employed be nonadsorptive synthetic polymeric yarns. Outdoor use of the carpet tiles often employs synthetic yarns composed of olefinic resins like polypropylene or polyester, nylon or acrylic-type materials.

The tufted carpets and carpet tiles described have proven to be quite difficult to bond to the back surface of the base fabric containing the tufted yarns. Part of the difficulty involved in such bonding is that the solid heavily loaded backing sheet is difficult to heat to a high temperature and is reduced in thermoplasticity and flexibility. Further, the large amount of inert material reduces considerably its heat capacity and thermoplasticity used for bonding purposes. The addition of a thermoplastic resin to the backing sheet composition often enhances its bonding characteristics, but, however, makes the backing sheet more expensive and reduces its weight. In addition, adhesives generally available for bonding are not quite satisfactory in that an insufficiently strong bond is often formed or such bond deteriorates in use. Furthermore, because of the thermoplastic nature of the base fabics where such a base fabric is used, the use of high heat-sealing techniques is undesirable because of the possibility of excess shrinkage of the base fabric or even melting the base fabric or yarns, resulting in damage to the base and/or to the tufted portion of the carpet. Accordingly, a method has not been found for producing an integral carpet having a solid backing which overcomes many of the deficiencies of the prior art.

SUMMARY OF THE INVENTION

The present invention is directed to forming an integral carpet structure by a method which includes bonding the tufted yarn loops to a backing fabric with a plastisol composition and then heat-sealing a backing sheet containing a thin layer of a thermoplastic foam thereon to the plastisol coating. More specifically, the method involves applying a heat-sensitive plastisol composition to the back of a thermoplastic base fabric to which are attached tufted yarns. Heat is then applied to the plastisol coating in order to fuse the plastisol to bond the tufted yarns which are loosely attached to the base fabric. After the tufted yarns and the base fabric are locked together, additional heat is applied to the surface of the plastisol. A relatively cold thermoplastic sheet, i.e., a solid sheet having a foam layer, is contacted with the heated plastisol surface. The temperature of the plastisol surface is sufficient to melt or substantially melt the contacting foam surface of the thermoplastic sheet, thereby bonding the solid thermoplastic resin sheet to the fused plastisol layer creating an integral structure.

It should be noted that the application of heat throughout the process is to the plastisol layer; first to fuse it, thereby locking the tufted yarns and the base fabric, and secondly, to provide the sole source of sensible heat to the relatively cold backing sheet to effect the heat sealing of the sheet to the tufted structure. Therefore, in the preparation of the carpet, according to the present invention, a temperature gradient exists from the outer edges inwardly wherein the outer portions, i.e., the tufted yarns and the thermoplastic backing sheet are relatively cold in relation to the plastisol layer.

Accordingly, the invention comprises a method of preparing sheet materials having a solid backing sheet secured thereto, such as tufted carpet tiles having a highly loaded solid backing sheet. In the method of preparation, a layer of a thermoplastic resin, such as a vinyl chloride resin plastisol, is applied onto the back surface of a sheet covering material characterized in having a tufted pile face surface with yarn loops on the back surface thereof, the yarn secured in a scrim or base fabric, particularly a thermoplastic base sheet. The method includes heating the plastisol in order to fuse the plastisol after permitting the plastisol to flow in the interstices on the back surface of the fabric sheet and on fusing, to lock the yarns to the base sheet. The temperature selected for fusing should be insufficient to shrink substantially the thermoplastic material of the base sheet or the thermoplastic fibers of the face surface. Thereafter, the surface of the fused vinyl chloride plastisol composition is heated to impart sensible heat thereto, the heating typically being accomplished by directing heat from a high-intensity heat source, such as a flame burner or infrared lights, onto the exposed back surface.

A solid backing sheet material which is desired to be secured to the back surface of the base sheet, which contains a layer, is provided. The solid backing sheet material may comprise a thermoplastic resin which would also contain inert material as filler, and a least one surface of the backing sheet should contain bonded thereto or as an integral part thereof a thin layer of a foamed thermoplastic resin. The foam layer should be sufficient in thickness so that on melting, a secure bond will be provided by the melted resin between the solid backing sheet and the heated base sheet, although, additional unmelted foam may be employed as desired to impart resiliency to the ultimate carpet product. Thereafter, the heated surface of the fused resin is contacted typically under pressure with the foam layer of the backing sheet. On contacting, the thin-foam layer melts or at least a portion of the foam layer melts, which melting is occasioned by employing substantially only the sensible heat in the heated fused resin, thereby, on cooling, bonding the solid backing sheet to the surface of the fused resin to form an integral solid back carpet.

In general, any thermoplastic foam material may be employed as the bonding layer, either open or closed-cell material, provided only that the resin selected will be melted by the sensible heat of the fused plastisol. A sufficient layer of the foam should be employed so that substantially all of the foam layer is melted by the sensible heat to form a thin melted fused bonding layer between the backing sheet and the base sheet. Where desired, however, the foam layer may be thicker so as to provide a laminate structure which contains an unmelted foam layer between the solid backing sheet and the fused resin material. The foam layer on the backing sheet may vary in thickness, for example, from about 0.1 to 1 times the thickness of the backing sheet, e.g., 10 to 200 mils. The carpet product produced by our method is unique in that the backing sheet is bonded directly through a melted thermoplastic foam layer to the back of the thermoplastic resin employed to lock in the fabric and that no other adhesives are required. It is often desirable to employ the same or a similar vinyl chloride resin or mixture in the plastisol composition as in the backing sheet in order to provide compatible and excellent bonding characteristics between all of the layers.

In an alternative embodiment a radiant energy reflective coating is applied to one surface of the thermoplastic base fabric. This reflective coating may be applied prior to the application of the tufted yarns into the base fabric or after such tufted yarns have been inserted. The application of a radiant energy reflective coating to the thermoplastic base fabric prior to the application of the heat-sensitive plastisol composition and the subsequent fusing and heating steps provides still greater protection to the thermoplastic base fabric which is normally subject to shrinkage and/or melting.

Conventional radiant energy reflective compositions are employed satisfactorily in the present invention. Preferably metallic compositions, such as those containing aluminum, or white or light colored compositions, are employed. The particular radiant energy reflective composition should be selected with regard to the plastisol composition to insure that adhesion problems between the plastisol and base fabric do not arise. The radiant energy reflective surface may be applied by any conventional method known to the art, for example, spraying, casting, roller coating and, particularly in the case of metal, vacuum deposition or sputter deposition. It should be noted that it is not critical that a continuous heat-reflective layer be formed. In a particularly preferred embodiment, an aluminum-pigmented vinyl ink is employed.

The alternative embodiment of preparing the improved integral tufted pile carpets includes the steps of applying a radiant energy reflective surface to at least one surface of a thermoplastic base fabric and needling tufted yarns into the base fabric on the side of said base fabric opposite that which carries the radiant energy reflective surface. The tufting operation may be carried out either before or after the application of the radiant energy reflective surface. Preferably, it is carried out after the reflective surface is applied. The base fabric is then coated with a plastisol composition which is fused to bond the tufted yarns to the base fabric. The outer surface of the plastisol composition is then treated with a high energy heat source to impart sufficient sensible heat to the top surface of the plastisol composition to melt a thermoplastic sheet when said sheet is placed in contact with said surface, thus providing the improved integral tufted carpet of the present invention.

The solid backing sheet employed in our invention may comprise any solid, flexible or semiflexible sheet material. Typical backing sheets used are those flexible sheets comprising a thermoplastic resin, such as a vinyl chloride resin, for example, a polyvinyl chloride resin or a vinyl chloride copolymer, such as a vinyl chloride-vinyl acetate resin. The thermoplastic resin is typically compounded with inert filler material to add weight and reduce the cost of the sheet. The amount of filler material may vary, but such backing sheets may contain from 100 to 350 parts of filler material (phr.), for example, 150 to 250. Lesser amounts of filler materials often increase cost of the backing sheet and reduce its weight, while higher amounts decrease the flexibility and cohesion of the sheet and render it more frangible. Other materials typically employed with thermoplastic resins may also be employed in the backing sheet composition, such as stabilizers, pigments, dyes, plasticizers, compounding oils and other additives.

Inert filler material used in the backing sheet may comprise any solid, inert particulate material in fiber, granular, powder or other form, such as fibers of asbestos glass and natural and synthetic products, such as polymeric fibers, jute, cotton and the like, as well as granular-type materials, such as clays, diatomaceous earth, metal oxides, carbonates, sulfates and other salts, such as calcium carbonate, barium sulfate, calcium oxide, barium oxide, titanium dioxide as well as alumina, carbon black, silica, saw dust, wood pulp. sand, paper and other inert materials.

Where desired, the back surface of the backing sheet or even within the sheet there may be a woven or nonwoven fibrous sheet material, such as a grid-like glass fiber, scrim sheet, screens, paper, resin-reinforced paper fabrics and other sheet materials which are often laminated to or included in the backing sheet to aid in handling characteristics, or to provide stability to the resulting carpet product. In addition, the back surface may have a skid-resistant design embossed therein or the surface roughened to aid in skid resistance or to aid in bonding of the back surface to a subfloor.

The face surface of the backing sheet; that is, the surface to be bonded to the back surface of the base sheet and the plastisol composition contains a layer of a thermoplastic foam which may be open or closed-cell. The foam layer thickness used in our invention may vary, depending on whether the entire foam layer or substantially all of the foam layer thereof is to be melted by the sensible heat of the plastisol composition or whether only a portion of the foam is to be so melted. The thickness of the foam layer may vary, e.g., from 0.1 to up to 3 times the thickness of the backing sheet; for example, 0.1 to 1.0. The foam layer may be from 5 to 200 mils or 10 to 50 mils where the entire foam layer is to be melted. Where the foam layer is not melted but is to remain an intermediate foam layer between the backing sheet and the base sheet, the layer is preferably a flexible foam layer, such as a closed-cell foam layer which serves as an insulating and moisture barrier, while providing a resilient surface. Preferably, the foam layer is secured to the base surface of the backing sheet, but where desired, the foam layer may be inserted or interposed as a separate thin-foam layer between the solid backing sheet and the fused base sheet where the entire foam layer is to be melted, the melted foam layer therefore bonding both the back sheet and the base sheet. The use of a backing sheet containing a foam layer shall be used to mean the use of a separate foam layer.

The thickness of the solid backing sheet may vary as desired, but usually is from 50 to 400 mils, for example, 100 to 300 mils in thickness.

The foam layer may be formed by bonding a thin layer of the foam to the face surface of the backing sheet, such as by adhesives or casting a gas-expandable thin layer of a vinyl chloride resin plastisol onto the face surface and subsequently, heating the face to form an integrally bonded thin-foam layer thereon. For example, a thin layer of a gas-expandable vinyl chloride plastisol composition, such as that employed on the base sheet but containing a blowing agent, such as azodicarbonamide, is cast in a thin layer on the face surface, this thin layer is then heated by a directing a high-intensity heat thereto, for example, infrared lamps or high-intensity flame heat, to fuse the resin, decompose the blowing agent and to expand the resin to form the foam layer of the desired thickness and density. A thin plastisol would comprise a 1–5 mil layer which is then heated to a temperature of 350–400° F. to form the thin-foam layer thereon.

BRIEF DESCRIPTION OF THE DRAWINGS

FIG. 1 is a schematic illustration of the process of the present invention.

FIGS. 2(a) to (e) illustrate cross-sectional views of enlarged fragmentary materials at various steps of the process shown in FIG. 1.

FIG. 3 is a cross-sectional fragmentary view of alternative material prepared in an embodiment of the present invention.

DESCRIPTION OF THE PREFERRED EMBODIMENTS

Tufted material 10 composed of loops 25, e.g., of nylon, secured to base fabric 26, e.g., a polypropylene, is coated with heat-sensitive vinyl chloride resin plastisol 12 from reservoir 11. The product is then heated in oven 15 to fuse the plastisol and secure the tufted loops to the base fabric. The coated material then passes under high-intensity heat source 16 directed toward the surface of the fused plastisol to impart sufficient sensible heat to the plastisol coating to provide a heat seal to the relatively cool backing sheet comprising a solid heavily loaded vinyl chloride resin sheet 17 and a thin-foam vinyl chloride resin layer 23 on the surface. The sensible heat is sufficient to melt all or substantially all of the foam layer, thereby adhering the solid backin sheet 17 to the fused plastisol layer by the melted foam layer 30 as the sheet and coated material pass through opposing pressure rolls 18. Optionally, a heated embossing roll 19 is employed with an opposing pressure roll 20 to the back surface 29 of the backing sheet 17 to emboss a pattern 31, such as a waffle-like diamond or roughened pattern, on the back surface of the backing sheet. Cooling rolls 21 are also optionally employed before the finished carpet 22 is rolled or the carpet may then be cut into sectional tile pieces.

In FIG. 3, a cross sectional portion of a carpet is shown wherein a foam layer 23 remains after bonding the backing sheet 17 to the fused plastisol composition 12.

The tufted yarns suitable for employment in the present invention may comprise any of the conventional natural or synthetic fibrous materials, thermoplastic and nonthermoplastic, for example, wool, cotton, nylon, acrylic, modacrylic, rayon, olefinic resins, polyesters, urethanes and similar materials.

The base fabric to which the tufted yarns are applied of comprise woven or nonwoven webs or sheet material of yarns or fibers. As examples of suitable thermoplastic materials, mention may be made of polyolefins, such as polypropylene and polyethylene, polyamides, polyesters, polyacrylics, vinyls such as vinyl chloride, urethane and the like. Webs with other textile yarns such as cotton, jute, rayon and paper are also employed alone or in combination with the thermoplastic yarns to form the base fabric. In addition, the yarns or fibers in the base fabric or face may comprise any form—cylindrical, elliptical, ribbon-shaped and may comprise a thermoplastic resin extruded, coated or otherwise formed as an outer material over an inner core material, such as a vinyl chloride resin extruded over a nylon, polyester, acrylic or other core material.

The plastisol is preferably polyvinyl chloride or a vinyl chloride copolymer. In a preferred embodiment low molecular weight, dispersion grade resin is employed. In a particularly preferred embodiment a vinyl chloride-vinyl acetate copolymer is employed wherein the vinyl acetate components of the copolymer are in the range of 5 to 15% by weight. If desired, conventional plasticizers such as dioctyl phthalate are employed. Plasticizers are employed at a level of 60 to 120 parts of plasticizer per 100 parts of resin on a weight basis. Preferably, 90 parts of plasticizer per 100 parts of resin are employed. Typical compositions for use in the invention include compositions as follows:

| Ingredients | Parts by weight | | |
|---|---|---|---|
| | Plastisol | Foam | Backing sheet |
| Dispersion grade thermoplastic resin copolymer, 90 parts vinyl chloride, 10 parts vinyl acetate | 100 | 50 | 100 |
| Polyvinyl chloride, low molecular weight | | 50 | |
| Plasticizer, dioctyl phthalate | 90 | 55 | 100 |
| Plasticizer, epoxidized soybean oil | 5 | 5 | |
| Plasticizer, phthalate | | 5 | |
| Stabilizer, barium-cadmium soap | 3 | | 2 |
| Stabilizer, lead | | 1 | |
| Thickener, silica aerogel | 5 | | |
| Blowing agent, azodicarbonamide | | 1.5 | |
| Inert filler material, calcium carbonate | | 2.5 | |
| Inert filler material, barium sulfate | | | 300 |

The viscosity of the plastisol composition should be such that it will flow sufficiently to fill in the interstices between the tufted yarns and the fibers of the base fabric to lock the tufted yarns to the base fabric. No loss of resiliency in the carpet results from the filling of the interstices because of the thermoplastic nature of the plastisol. The plastisol also covers the outer fibers of the base fabric sufficiently to prevent the excessive melting or shrinkage of the base fabric. If desired, thickening agents conventionally employed with plastisols are employed to prevent the excessive penetration of the plastisol into the base fabric and through to the outer surface of the tufted loops. It is necessary, however, that the viscosity of the plastisol be selected so that sufficient penetration be achieved to bond the tufted yarns to the base fabric and that sufficient plastisol be retained on the outer surfaces of the base fabric to permit the bonding of the base fabric to the thermoplastic sheet.

In another embodiment, the plastisol is applied in at least two applications wherein the first application is employed to lock the tufted yarns to the base fabric and fill the interstices, and the second, of a considerably higher viscosity is employed to be held on the outer surfaces of the base fabric to provide the bonding of the base fabric to the thermoplastic sheet.

The thermoplastic backing sheet is employed to provide weight to lay flat, particularly if the carpeting is to be cemented to the flooring. Preferably, the foam layer is a closed-cell foam such as a vinyl chloride foam, olefinic foam like polyethylene, polypropylene or a polyurethane foam. The density of the thermoplastic foam sheet employed may range from about 2 pounds per cubic foot to up to almost a solid sheet. Preferably, a foam having a density of from 2 to 25 pounds, e.g., 20 pounds per cubic foot and a thickness of 25 mils is employed. The solid backing sheet may be 150 mils thickness. The coating weight of the plastisol layer is generally 1 to 4 pounds per square yard, preferably with thickness of 0.05 to 0.300 inch, preferably 0.150 inch.

In the present invention, the plastisol is applied to the base fabric or the gas-expandable plastisol to the face surface of the backing sheet by conventional means, for example, by a doctor blade, by spraying, by roller coating, or by extrusion. Because of the viscosity of the material, a doctor blade is preferably employed in applying a plastisol composition.

After the application of the plastisol 12, heat is applied to the side of the structure upon which the plastisol has been coated in order to fuse the plastisol, thus locking the tufted yarns to the base fabric and, at the same time, protecting the thermoplastic components of the base fabric from excessive shrinkage or melting. It is not necessary to heat the entire structure in order to fuse the plastisol, in fact, it is preferable that the heat be applied only to the plastisol coating. Accordingly, even though an oven or some such source of heat is employed, the heat is directed only to that side of the structure on which the plastisol is located. After the plastisol has been fused, heat from a high-intensity heat source, such as infrared lamps or a flame, is applied to the surface of the fused plastisol to raise the temperature sufficiently to melt the thermoplastic foam layer when it contacts the plastisol layer, thus forming the bond. The temperature of the plastisol coating is preferably in excess of 350° F., more preferably 400° F., at the time of lamination, e.g., 350–425° F. It should be noted, where a thermoplastic filler is used, that the backing sheet is not heated nor is the tufted pile side of the structure heated. The temperature of the materials other than the surface of the plastisol is preferably maintained as cool as possible, e.g., below 200° F. Where a closed-cell foam is employed, the application of heat is especially to be avoided, since the excessive heat can cause the collapse of the foam.

Embossing of the backing layer is achieved through contacting the layer with a heated roll which partially melts the outer surface to provide the desired pattern, either before or after the bonding operation.

The process of the present invention can be employed with both a combination of solid sheet of thermoplastic material and a foam layer. The method permits the heat-sealing of a heavily loaded backing sheet to a synthetic thermoplastic base fabric. Since the thermoplastic backing sheet is preformed, it can be colored to match the color of the tufted yarns so that damage or wear to the carpet surface will expose a material of the same color, thereby making the damage or wear unobvious whereas in a rug employing, for example, latices, the different color of the latex backing material would be readily apparent.

The invention has been illustrated with the use of a solid heavily loaded vinyl halide resin backing sheet; however, it is recognized and within the scope of this invention that any solid sheet material may be used as a backing, such as a solid olefinic or vinyl chloride resin sheet with or without filler material.

What is claimed is:

1. A method of preparing sheet-covering materials, such as tufted carpet tiles, which method comprises:
   (a) applying a layer of a vinyl chloride resin plastisol to the back surface of a sheet-covering material characterized in having a tufted pile-face surface with the yarn secured in a base fabric;
   (b) heating the vinyl chloride resin plastisol composition to a temperature sufficient to fuse the resin and to lock the tufted yarns to the base fabrics;
   (c) heating the surface of the fused plastisol composition to impart sensible heat thereto;
   (d) providing a backing sheet material comprising a solid thermoplastic resin having bonded to at least one surface thereof a thin layer of a thermoplastic resin foam;
   (e) contacting the heated surface of the fused plastisol with the foam layer of the backing sheet; and
   (f) melting all or substantially all of the thermoplastic foam layer, employing substantially only the sensible heat in the heated pastisol to form a thin melted bonding layer between the solid resin and the fused plastisol, thereby bonding the solid backing sheet to the plastisol composition and forming a sheet-covering product.

2. The method of claim 1 wherein the base fabric comprises a thermoplastic fiber subject to shrinkage at temperatures in excess of about 200° F. and wherein heating of the plastisol composition is accomplished at a temperature insufficient to shrink substantially the thermoplastic fibers in the base fabric.

3. The method of claim 1 wherein the heating of the plastisol composition is accomplished by directing heat solely to the exposed surface of the plastisol composition.

4. The method of claim 1 which includes applying the plastisol composition in a first layer in an amount sufficient to fill the interstices between the yarns exposed and the back surface of the base fabric and to lock the yarns on fusing of the plastisol composition to the base fabric, and in a second layer applied onto the first layer, the second layer being of a higher viscosity than the first layer, the second layer adapted to be heated for sensible heat.

5. The method of claim 1 wherein the temperature fusing the plastisol composition is less than about 200° F.

6. The method of claim 1 wherein the surface of the fused plastisol composition is heated solely by directing heat from a high intensity heat source onto the surface of the fused plastisol composition.

7. The method of claim 1 wherein the surface of the fused plastisol composition is heated to a temperature of at least 350° F. to impart sensible heat thereto.

8. The method of claim 1 wherein the solid backing sheet comprises a vinyl chloride resin which contains from about 100 to 350 parts by weight per hundred parts of the resin of an inert filler material and the foam layer comprises a vinyl chloride resin foam material.

9. The method of claim 1 wherein the foam layer on the backing sheet varies in thickness from about 0.1 to 3 times the thickness of the backing sheet.

10. The method of claim 1 which includes providing the backing sheet by coating onto one surface of the backing sheet a thin layer of a vinyl chloride resin plastisol containing a blowing agent and heating the surface of such layer to form a thin coating of a vinyl chloride resin foam thereon and bonded thereto, which foam layer is adapted to be melted by the sensible heat of the heated fused plastisol composition.

11. The method of claim 1 which includes applying a layer of a radiant energy reflective surface onto the back surface of the base fabric prior to applying a vinyl chloride resin plastisol composition thereto.

12. A method of preparing a tufted carpet, which method comprises:
   (a) applying a thin coating of a vinyl chloride resin plastisol to the back surface of a sheet-covering material characterized in having a tufted pile face surface with exposed yarns on the back surface, the yarns secured to a base sheet comprising thermoplastic fibers, the plastisol filling in the interstices between the yarns of the back surface;
   (b) applying heat solely to the exposed surface of the vinyl chloride resin plastisol composition to fuse the resin and to lock the yarns to the thermoplastic base sheet, the temperature of fusing insufficient to shrink substantially the thermoplastic fibers of the base sheet;
   (c) heating the surface of the fused plastisol composition by directing heat from a high-intensity source onto the fused plastisol composition surface to impart sensible heat thereto;
   (d) providing a solid backing sheet material comprising a vinyl chloride resin which contains from about 100 to 300 parts per hundred parts of a resin of an inert filler material, one surface of the backing sheet having bonded thereto a thin layer of a vinyl chloride resin foam;
   (e) pressing the vinyl chloride resin foam layer of the backing sheet into intimate contact with the heated surface of the fused plastisol composition; and
   (f) melting all or substantially all of the thin foam layer employing substantially only the sensible heat in the heated plastisol composition, thereby bonding the solid backing sheet securely to the plastisol composition and providing a carpet product.

13. The method of claim 12 wherein the temperature of fusing the plastisol composition is maintained at a temperature of not more than 200° F. and wherein the temperature of imparting sensible heat to the fused plastisol layer is at a temperature of at least 350° F.

14. The method of claim 12 wherein the plastisol contains a vinyl chloride-vinyl acetate resin and the vinyl foam contains a low molecular weight polyvinyl chloride resin.

References Cited

UNITED STATES PATENTS

| | | | |
|---|---|---|---|
| 3,560,284 | 2/1971 | Wisotzky et al. | 161—66 X |
| 2,994,929 | 8/1961 | Kessler | 161—66 |
| 3,010,180 | 11/1961 | Hoffman | 161—62 X |
| 3,075,865 | 1/1963 | Cochran | 156—148 X |
| 3,075,867 | 1/1963 | Cockran | 161—66 X |
| 3,238,595 | 3/1966 | Schwartz et al. | 28—74 |
| 3,264,167 | 8/1966 | Sands | 161—62 |
| 3,383,259 | 5/1968 | Cockran | 156—148 |
| 3,441,464 | 4/1969 | Blue | 156—148 |
| 3,457,135 | 7/1969 | Slington | 156—148 |
| 3,533,893 | 10/1970 | Hartstein | 161—66 |

ROBERT F. BURNETT, Primary Examiner

R. L. MAY, Assistant Examiner

U.S. Cl. X.R.

156—209, 272, 306, 321; 161—66